(12) United States Patent
Hayashi et al.

(10) Patent No.: US 6,989,611 B2
(45) Date of Patent: Jan. 24, 2006

(54) ELECTRONIC AUTOMOBILE ANTI-THEFT APPARATUS

(75) Inventors: Masaki Hayashi, Aichi (JP); Toshihiro Nagae, Aichi (JP); Masaki Yoshino, Aichi (JP); Shinji Kishida, Toyota (JP); Koji Iwamoto, Toyota (JP); Toshio Asahi, Toyota (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 170 days.

(21) Appl. No.: 10/266,392

(22) Filed: Oct. 8, 2002

(65) Prior Publication Data

US 2003/0067222 A1 Apr. 10, 2003

(30) Foreign Application Priority Data

Oct. 9, 2001 (JP) .................................... 2001-311386
Oct. 9, 2001 (JP) .................................... 2001-311389

(51) Int. Cl.
*B60R 25/00* (2006.01)

(52) U.S. Cl. .................................................... 307/10.2
(58) Field of Classification Search ............... 307/9.1, 307/10.1, 10.2, 10.3
See application file for complete search history.

(56) References Cited

U.S. PATENT DOCUMENTS

| | | | | |
|---|---|---|---|---|
| 5,451,925 A | * | 9/1995 | Le | 340/426.11 |
| 5,623,440 A | * | 4/1997 | Saito | 365/149 |
| 5,695,429 A | * | 12/1997 | Kataumi et al. | 477/96 |
| 6,059,687 A | | 5/2000 | Durieux et al. | |
| 6,107,694 A | * | 8/2000 | Mostrom | 307/10.2 |
| 6,130,604 A | * | 10/2000 | Matsumoto et al. | 340/5.64 |
| 6,400,041 B1 | * | 6/2002 | Engelmann et al. | 307/10.2 |
| 6,414,586 B1 | * | 7/2002 | Yoshizawa | 340/5.2 |
| 6,433,675 B1 | * | 8/2002 | Suda et al. | 340/426.11 |
| 6,479,908 B1 | * | 11/2002 | Utter et al. | 307/10.3 |
| 6,703,721 B1 | * | 3/2004 | Kito | 307/10.3 |
| 2001/0050511 A1 | * | 12/2001 | Kachouh | 307/10.2 |
| 2002/0175566 A1 | * | 11/2002 | Allen et al. | 307/10.3 |
| 2004/0012261 A1 | * | 1/2004 | Albert | 307/10.2 |
| 2004/0090124 A1 | * | 5/2004 | Geber et al. | 307/10.3 |

FOREIGN PATENT DOCUMENTS

| | | |
|---|---|---|
| DE | 199 48 969 A1 | 4/2001 |
| DE | 10039090 A1 * | 2/2002 |
| EP | 0 495 667 A1 | 7/1992 |
| EP | 1 359 068 A1 | 11/2003 |
| EP | 1 359 070 A1 | 11/2003 |
| JP | 10-59132 A | 3/1998 |
| JP | 10-244853 A | 9/1998 |
| WO | WO 90/09649 A1 | 8/1990 |
| WO | WO 01/23229 A1 | 4/2001 |

* cited by examiner

*Primary Examiner*—Brian Sircus
*Assistant Examiner*—Brett Squires
(74) *Attorney, Agent, or Firm*—Crompton, Seager & Tufte, LLC

(57) ABSTRACT

An electronic automobile anti-theft apparatus having high reliability includes a motor, which moves a lock pin to selectively lock a steering shaft of an automobile. An ECU controls the operation of the motor. A detector generates a detection signal when a shift lever of shift device for a transmission of the automobile is arranged at a parking position. A power transistor goes on in response to the detection signal to permit power to be supplied to the motor.

9 Claims, 12 Drawing Sheets

ELECTRONIC AUTOMOBILE ANTI-THEFT APPARATUS

BACKGROUND OF THE INVENTION

The present invention relates to an electronic automobile anti-theft apparatus, and more particularly, to an electronic automobile anti-theft apparatus that prevents an automobile from being stolen by locking a steering wheel through electronic control.

A mechanical steering wheel lock is widely used in the prior art to prevent automobile theft. FIG. 1 shows an example of a steering lock 51, which includes a key cylinder 54 and a lock pin 52. A key (not shown) is inserted in the key cylinder 54 and rotated to actuate the lock pin 52 so that the lock pin 52 engages a steering shaft 53. This prohibits the rotation of the steering shaft 53 and a steering wheel (not shown).

Electronic key systems have recently become popular. An electronic key system starts an engine without using a key. Accordingly, there is a demand for an electronic automobile anti-theft apparatus, such as an electronic steering wheel lock that locks a steering wheel with an actuator (e.g., motor).

However, when employing an electronic steering wheel lock, electrical noise may cause an electronic control unit (ECU) to actuate a motor, which actuates a lock pin, and lock the steering shaft with the lock pin in an unintentional manner.

SUMMARY OF THE INVENTION

It is an object of the present invention to provide an electronic vehicle anti-theft apparatus having high reliability.

To achieve the above object, the present invention provides an electronic automobile anti-theft apparatus including a locking means for selectively locking a steering mechanism or a driving mechanism of an automobile. An actuator operates the locking means. A control unit controls the operation of the actuator. A detector detects the position of a shift lever for a transmission shift device of the automobile and generates a detection signal when the shift lever is located at a parking position. A switching device is connected to one of the actuator and the control unit to permit power to be supplied to the one of the actuator and the control unit in response to the detection signal.

A further perspective of the present invention is an electronic automobile anti-theft apparatus including a locking means for selectively locking a steering mechanism or a driving mechanism of an automobile. An actuator operates the locking means. A control unit controls the operation of the actuator. A shift lever switch is connected to one of the actuator and the control unit and cooperatively operated with a shift lever for a transmission shift device of the automobile. The shift lever switch goes on to permit power to be supplied to one of the actuator and the control unit when the shift lever is located at a parking position. A restriction unit selectively restricts movement of the shift lever from the parking position to another position. The restriction unit is supplied with power to permit the movement of the shift lever. A lock switch is connected between the restriction unit and a power supply and cooperatively operated with the locking means. The lock switch goes on to permit power to be supplied to the restriction unit when locking by the locking means is released.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
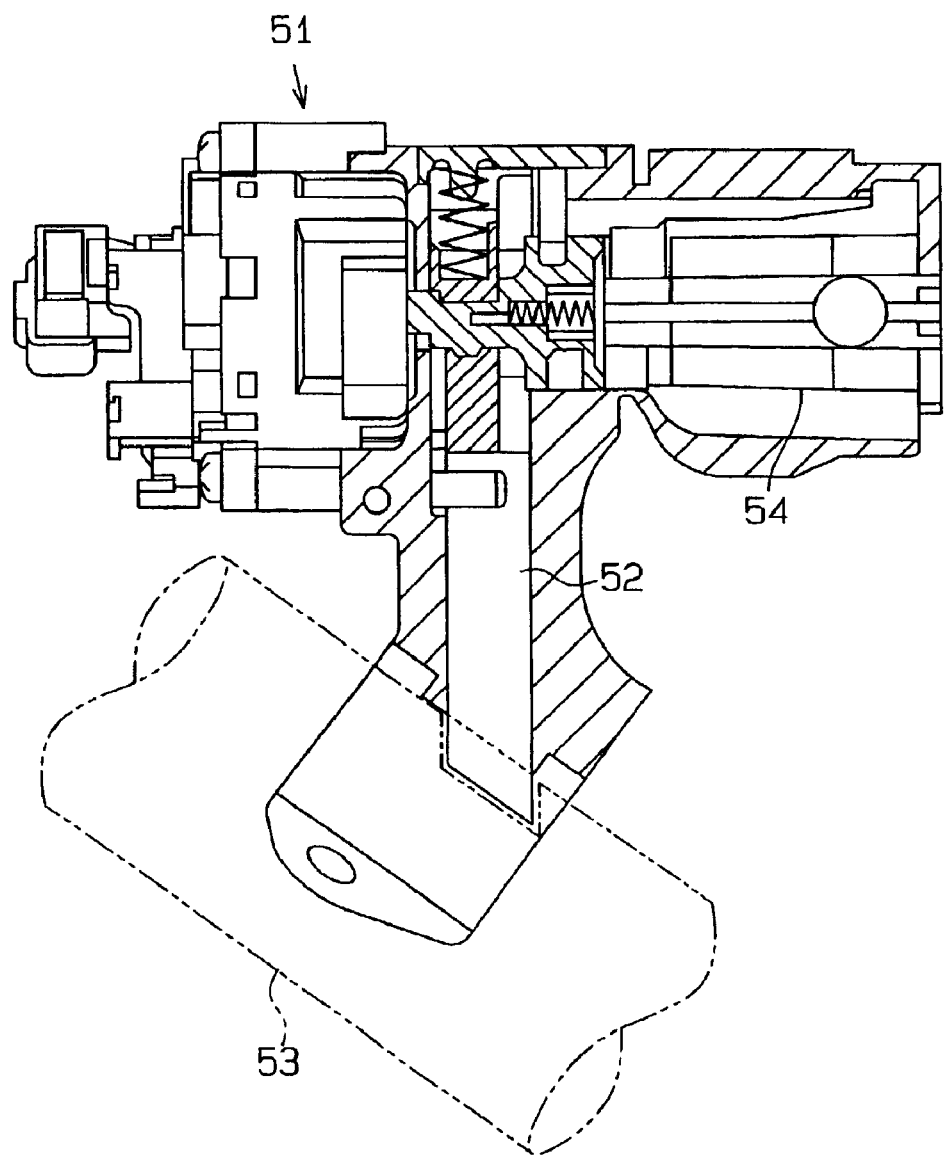
FIG. 1 is a cross-sectional view showing a prior art steering wheel lock.

In the drawings, like numerals are used for like elements throughout.

Figure 2:
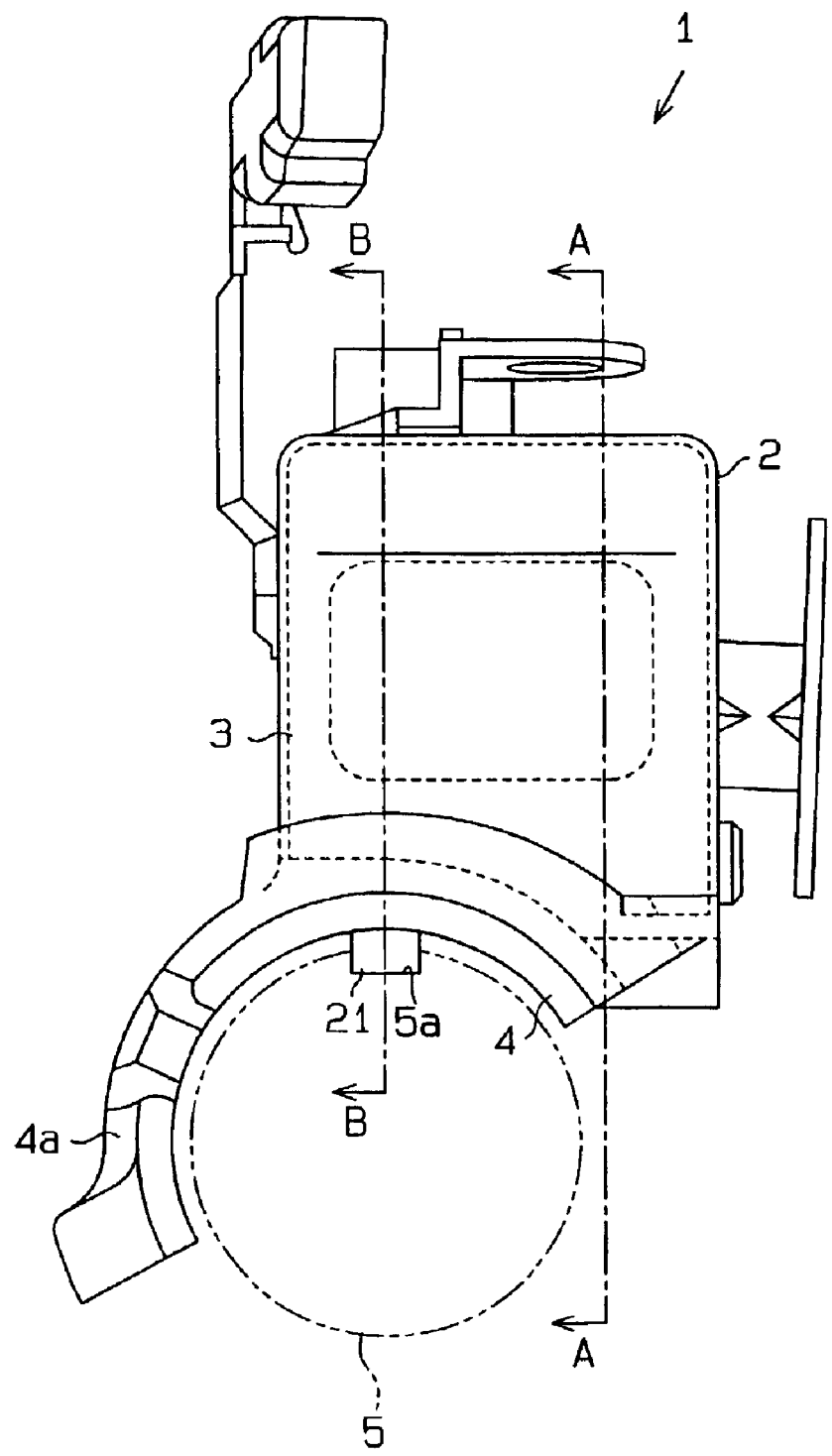
FIG. 2 is a side view of an electronic steering wheel lock according to a first embodiment of the present invention.

Referring to FIG. 2, an electronic steering wheel lock 1 according to a first embodiment of the present invention has a box-like case body 2. The case body 2 includes a lock body 4 and a cover 3, which is attached to the lock body 4. The electronic steering wheel lock 1 is installed in a steering post (not shown).

Figure 3:
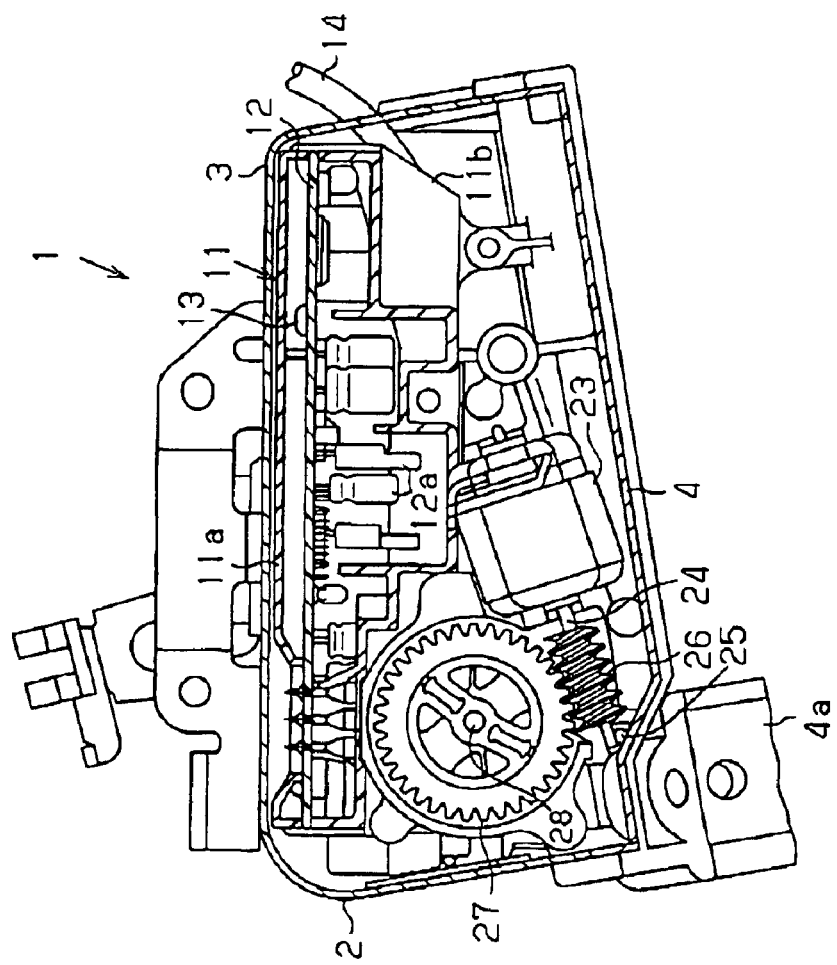
FIG. 3 is a cross-sectional view taken along line 3—3 in FIG. 2.
Figure 4:
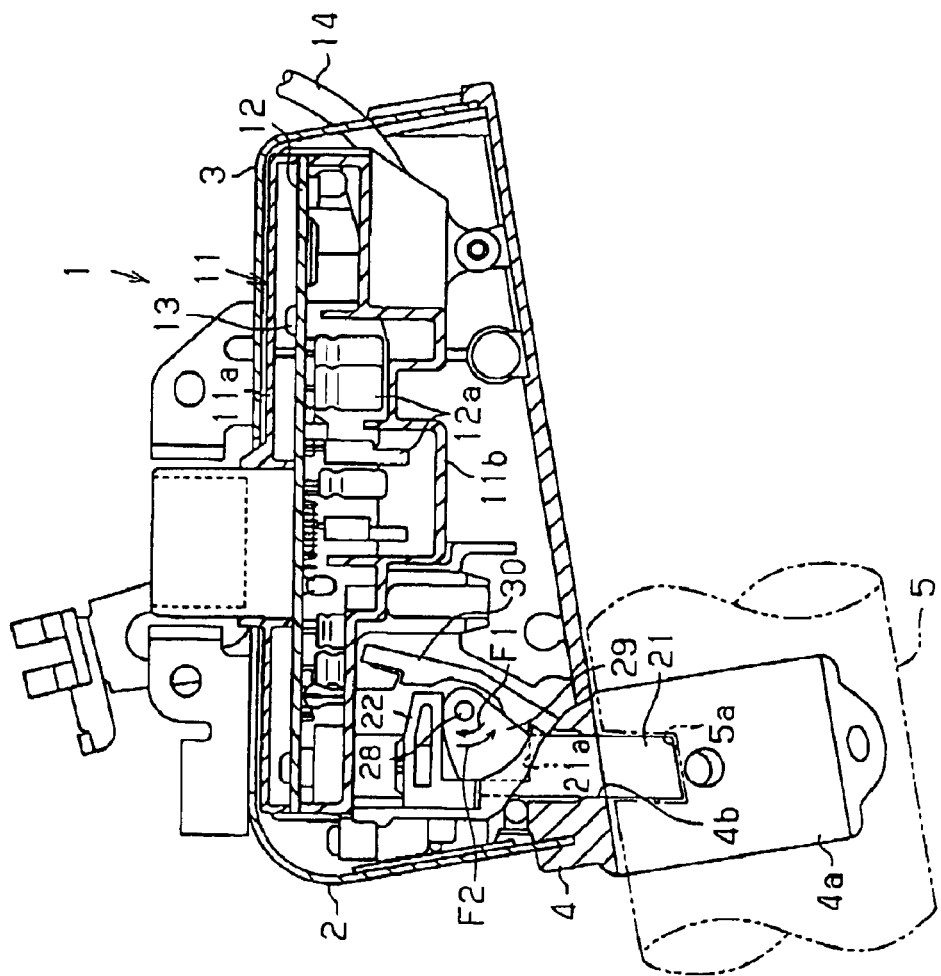
FIG. 4 is a cross-sectional view taken along line 4—4 in FIG. 2.

As shown in FIGS. 3 and 4, a retaining case 11, which is made of synthetic resin, is arranged in the cover 3. The retaining case 11 is formed by joining a first case 11a and a second case 11b. A printed circuit board 12 is retained in the retaining case 11. The printed circuit board 12 is fixed to the retaining case 11 by a screw 13. An electronic control unit (ECU) and electronic devices 12a, such as a capacitor, are connected to the printed circuit board 12. Further, an electric wire 14, which is electrically connected to the printed circuit board 12, extends outward from the retaining case 11. A verification ECU 37 is connected to the electric wire 14.

As shown in FIG. 2, a generally arcuate coupling portion 4a extends from the lock body 4. The coupling portion 4a is coupled to a column tube (not shown) by a bolt (not shown). The column tube is inserted through a steering shaft 5.

Figure 5:
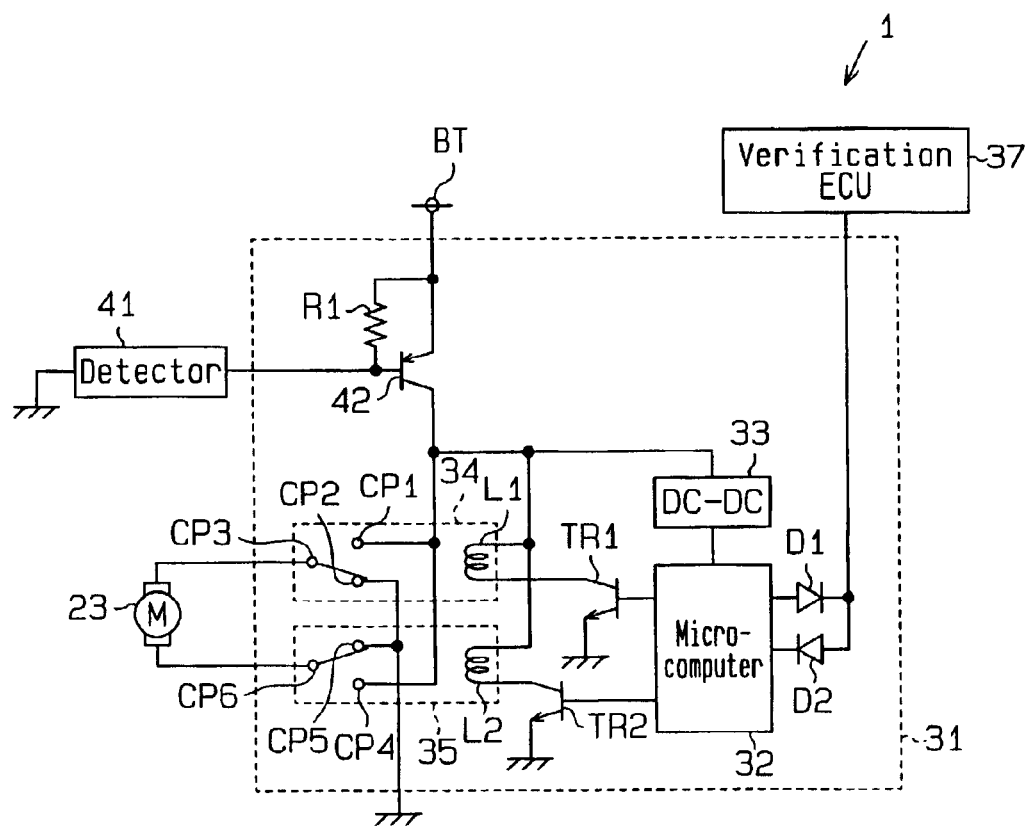
FIG. 5 is a circuit diagram of a control circuit of the electronic steering wheel lock according to the first embodiment.

A slot 5a is formed in the outer surface of the steering shaft 5. As shown in FIG. 5, the lock body 4 has a guide hole 4b. The guide hole 4b is formed at a position corresponding to the coupling portion 4a. When the case body 2 is attached to the column tube, the guide hole 4b is communicated with the interior of the column tube.

As shown in FIG. 4, a movable lock pin 21, which serves as a locking means, is arranged in the guide hole 4b. A pushed portion 21a and a hook 22 are defined on the basal portion of the lock pin 21. The distal portion of the lock pin 21 projects from and retracts into the lock body 4. The lock pin 21 resembles a square bar having a generally square cross-section. The cross-sectional area of the lock pin 21 is smaller than the cross-sectional area of the guide hole 4b. The distal portion of the lock pin 21 may be engaged with and disengaged from the slot 5a.

As shown in FIG. 3, a motor 23 is accommodated in the case body 2. The motor 23 has a first shaft 24. The distal portion of the first shaft 24 contacts a slide pin 25, which functions to position the first shaft 24. A worm gear 26 is arranged on the first shaft 24. The worm gear 26 is meshed with a spur gear 27, which is arranged on a second shaft 28, to drive the spur gear 27. The spur gear 27 rotates about the second shaft 28.

As shown in FIG. 4, a triangular cam 29 is attached to the second shaft 28. When the motor 23 rotates the first shaft 24 in a forward direction, the cam 29 rotates about the second shaft 28 in a clockwise direction (the direction indicated by arrow F1). When the motor 23 rotates the first shaft 24 in a reverse direction, the cam 29 rotates about the second shaft 28 in a counterclockwise direction (the direction indicated by arrow F2). That is, the cam 29 rotates in the same direction as the spur gear 27. When the cam 29 rotates in the direction of arrow F1, the cam 29 pushes the hook 22 and disengages the distal portion of the lock pin 21 from the slot 5a. When the cam 29 rotates in the direction of arrow F2, the cam 29 pushes the pushed portion 21a and engages the distal portion of the lock pin 21 with the slot 5a. When the motor 23 stops operating, the worm gear 26 restricts the rotation of the spur gear 27 and prohibits movement of the motor 23. That is, a driving mechanism of the lock pin 21 holds the lock pin 21 is a state engaged with or disengaged from the slot 5a when the motor 23 stops operating. The rotation of the cam 29 in the direction of arrow F2 is restricted when the cam 29 comes into contact with a rubber stopper 30.

With reference to FIG. 5, the motor 23 is controlled by an ECU 31. The ECU 31 is connected to the motor 23, a shift lever position detector 41, and a verification ECU 37.

The detector 41 is located near a shift lever or a transmission (neither shown). A non-contact sensor, such as a magnetic sensor or an optical sensor, is employed as the detector. A magnetic resistor, a magnetic proximity sensor, a Hall element, and a Hall IC are examples of a magnetic sensor. A phototransistor, a photodiode, a photoelectric switch, and a photointerrupter are examples of an optical sensor. The detector 41 generates a low detection signal when the shift lever is arranged at a parking position. The parking position refers to a state in which the shift lever is arranged at a parking (P) position and/or a state in which a parking lock of the transmission is functioning.

The verification ECU 37 communicates with a portable device (not shown), which is held by a driver, and compares an ID code stored in the portable device with an ID code stored in the verification ECU 37. The verification ECU 37 provides the ECU 31 with an encoded drive request signal including a lock release code when the two ID codes coincide with each other. The verification ECU 37 provides the ECU 31 with an encoded drive request signal including a lock code when the two ID codes do not coincide with each other such as when the driver holding the portable device moves away from the automobile.

The ECU 31 includes a microcomputer 32, which has a CPU, a ROM, and a RAM (none shown), a DC—DC converter 33, a PNP power transistor 42, a resistor R1, two transistors TR1, TR2, two diodes D1, D2, and two relays 34, 35.

The DC—DC converter 33 receives battery voltage from a battery (not shown) and converts the battery voltage to a drive voltage, which is supplied to the microcomputer 32. The power transistor 42 has a collector terminal, which is connected to the DC—DC converter 33, an emitter terminal, which is connected to a positive terminal BT of the battery, and a base connected to the detector 41. A resistor R1 is connected between the emitter terminal and the base terminal of the power transistor 42. When the power transistor 41 receives a low detection signal from the detector 41, the power transistor 42 is activated. This supplies the battery voltage to the DC—DC converter 33 via the power transistor 42.

A first terminal of a coil L1 in the relay 34 and a first terminal of a coil L2 in the relay 35 are connected to a node between the DC—DC converter 33 and the power transistor 42. A second terminal of the coil L1 is connected to the collector terminal of the transistor TR1. A second terminal of the coil L2 is connected to the collector terminal of the transistor TR2. The emitter terminals of the transistors TR1, TR2 are grounded. The base terminals of the transistors TR1, TR2 are connected to the microcomputer 32.

A first fixed contact CP1 of the relay 34 and a first fixed contact CP4 of the relay 35 are connected to a node between the DC—DC converter 33 and the power transistor 42. A second fixed contact CP2 of the relay 34 and a second fixed contact CP5 of the relay 35 are grounded. A movable contact CP3 of the relay 34 is connected to a first terminal of the motor 23. A movable contact CP6 of the relay 35 is connected to a second terminal of the motor 23.

When the first shaft 24 of the motor 23 is rotated in the forward direction, the coil L1 is excited. Thus, the movable contact CP3 contacts the first fixed contact CP1 in the relay 34. Further, the coil L2 is not excited. Thus, the movable contact CP6 remains in contact with the second fixed contact CP5 in the relay 35.

When the first shaft 24 of the motor 23 is rotated in the reverse direction, the coil L1 is not excited. Thus, the movable contact CP3 remains in contact with the second fixed contact CP2 in the relay 34. Further, the coil L2 is excited. Thus, the movable contact CP6 contacts the first fixed contact CP4 in the relay 35.

When the shift lever is located at the parking position, the power transistor 42 is activated and the microcomputer 32 is supplied with power. As a result, the microcomputer 32 provides the transistors TR1, TR2 with a control signal to activate the relays 34, 35 and drive the motor 23.

A pair of diodes D1, D2 are connected between the microcomputer 32 and the verification ECU 37. The microcomputer 32 receives the drive request signal from the verification ECU 37 via the diode D2. In response to the drive request signal, the microcomputer 32 provides the transistors TR1, TR2 with the control signal. More specifically, when the microcomputer 32 receives the drive request signal that includes the lock release code, the microcomputer 32 provides the transistor TR1 with a high control signal to activate the transistor TR1. This excites the coil L1 of the relay 34, rotates the first shaft 24 of the motor 23 in the forward direction, and disengages the lock pin 21 from the slot 5a.

When the microcomputer 32 receives the drive request signal that includes the lock code, the microcomputer 32 provides the transistor TR2 with a high control signal to activate the transistor TR2. This excites the coil L2 of the relay 35, rotates the first shaft 24 of the motor 23 in the reverse direction, and engages the lock pin 21 with the slot 5a.

The electronic steering wheel lock 1 of the first embodiment has the advantages described below.

(1) When the power transistor 42 receives a low detection signal, which indicates that the shift lever is arranged at the parking position, from the detector 41, the power transistor 42 goes on. This activates the microcomputer 32 and enables the motor 23 to be actuated. When the automobile is being driven, the shift lever is always located at a position other than the parking position. Thus, the actuation of the motor 23 is prohibited. This prevents noise from causing the electronic steering wheel lock 1 to be operated in an unintentional manner.

Further, the power transistor 42 is a non-contact type switching device. Thus, contact failure does not occur. Contact failure may occur when using a mechanical switch after a certain period of time elapses. Accordingly, the power transistor 42 has a higher reliability than a mechanical switch.

(2) The microcomputer 32, the relays 34, 35, and the motor 23 are connected to the battery via the power transistor 42. Thus, even if current leakage occurs when a power supply wire extending between the power transistor 42, the microcomputer 32, the relays 34, 35, and the motor 23 is short-circuited with the body of the automobile, the microcomputer 32, the relays 34, 35, and the motor 23 are not supplied with power as long as the power transistor 42 is inactivated. This prevents current leakage from causing the electronic steering wheel lock 1 to be operated in an unintentional manner.

(3) When the power transistor 42 is inactivated, the microcomputer 32, the relays 34, 35, and the motor 23 are not supplied with power. Thus, the entire ECU 31 stops functioning. This prevents noise from causing the electronic steering wheel lock 1 to be operated in an unintentional manner.

Figure 6:
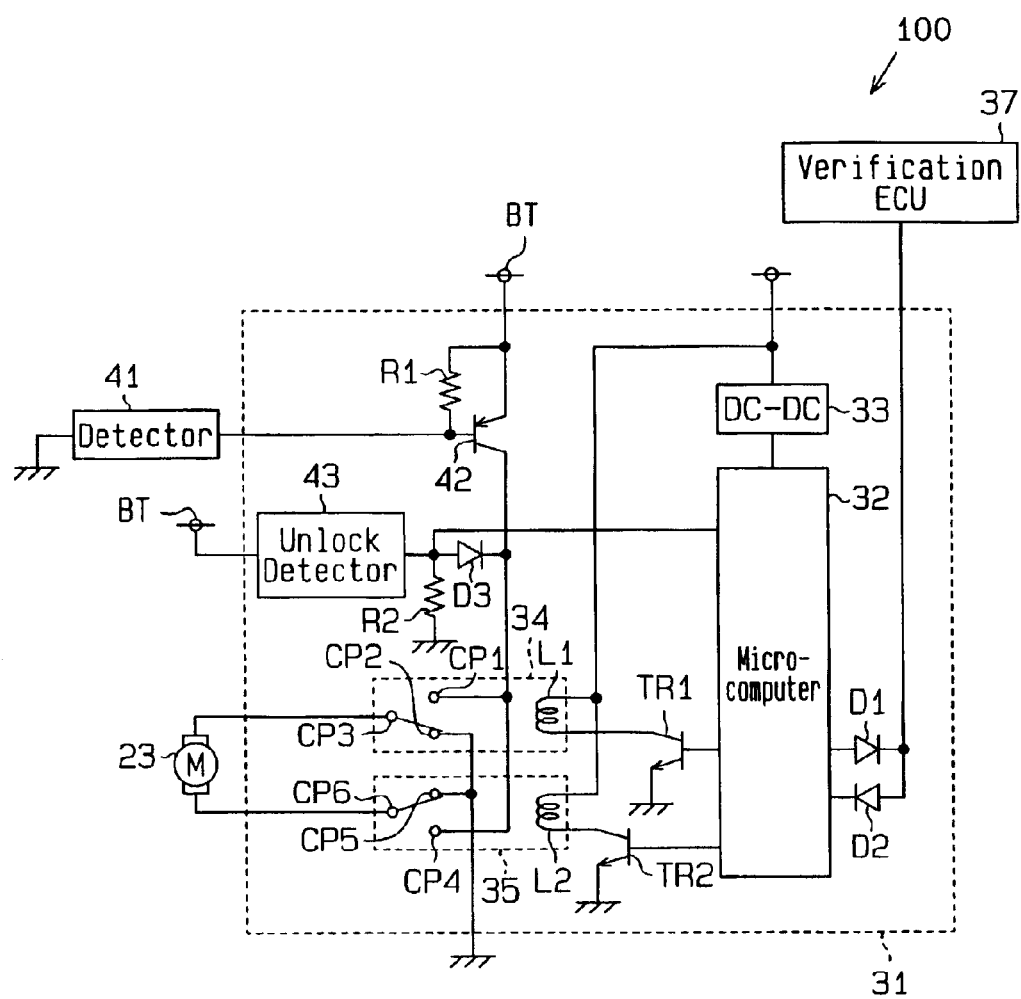
FIG. 6 is a circuit diagram of a control circuit of the electronic steering wheel lock according to a second embodiment of the present invention.

An electronic steering wheel lock 100 according to a second embodiment of the present invention will now be discussed with reference to FIGS. 6 and 7.

In the second embodiment, the positive terminal BT of the battery is connected to the first fixed contact point CP1 of the relay 34 and the first fixed contact point CP4 of the relay 35 via the power transistor 42. The DC—DC converter 33, the coil L1 of the relay 34, and the coil L2 of the relay 35 are directly connected to the battery.

The electronic steering wheel lock 100 includes an unlock detector 43, a resistor R2, and a diode D3. The unlock detector 43 is connected between the plus terminal BT of the battery and a first node between the transistor 42 and the relays 34 and 35.

The diode D3 is connected between the first node and the unlock detector 43. The resistor R is connected between the ground and a second node between the unlock detector 43 and the diode D3.

The unlock detector 43 is arranged in the vicinity of the basal portion of the lock pin 21 and detects a position of the lock pin 21. The unlock detector 43 selectively stops the supply of power to the diode D3 on the basis of the detection result. That is, the unlock detector 43 has a position detection function and a switching function. The unlock detector 43 includes a non-contact sensor and a non-contact switching device connected to the non-contact sensor, for turning on and off in response to a detection signal from the non-contact sensor.

Figure 7A:
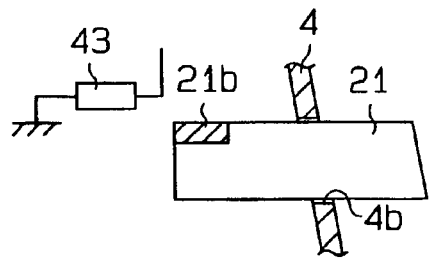
FIGS. 7(a) and 7(b) are schematic diagrams showing the relationship between an unlock detector and a lock pin on the electronic steering wheel lock of FIG. 6.
Figure 7B:
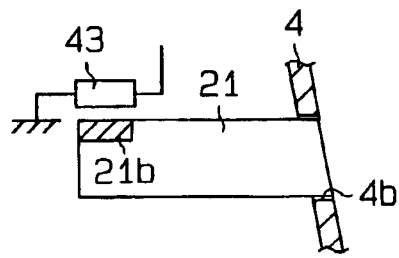

As shown in the state of FIG. 7(a), when a detected portion 21b defined on the basal end of the lock pin 21 is separated from the unlock detector 43 to engage the lock pin 21 with the slot 5a of the steering shaft 5, the unlock detector 43 permits power to be supplied to the motor 23 via the diode D3. When the detected portion 21b is located in the proximity of the unlock detector 43 to retract the lock pin 21 in the lock body 4 as shown in the state of FIG. 7(b), the unlock detector 43 stops the supply of power to the motor 23 from the battery. Thus, the motor 23 is supplied with power when the power transistor 42 is activated and/or when the unlock detector 43 detects a lock release state.

Accordingly, if the shift lever is shifted to a position other than the parking position when the lock body 4 is being disengaged from the slot 5a to unlock the steering shaft 5, the motor 23 is continuously driven until the unlocking is completed. The supply of power to the motor 23 is stopped when the unlocking is completed. That is, the motor 23 stops operating at the same time as when the unlocking is completed.

The microcomputer 32 receives the output voltage of the unlock detector 43 and detects whether the lock pin 21 is engaged with the slot 5a. More specifically, the output voltage is high when the lock pin 21 and the slot 5a are engaged with each other, and the output voltage is low when the lock pin 21 and the slot 5a are disengaged from each other. The microcomputer 32 stops outputting the control signal of the transistors TR1, TR2 if the output voltage fluctuates (when the lock pin 21 and the slot 5a are engaged with or disengaged from each other). The microcomputer 32 provides the detection result to the verification ECU 37 via the diode D1. Based on the detection result, the verification ECU 37 acknowledges whether the lock pin 21 and the slot 5a are engaged with or disengaged from each other.

The electronic steering wheel lock 100 of the second embodiment has the advantages described below.

(1) The power transistor 42 is activated when the shift lever is located at a position other than the parking position to enable the supply of power. If the power transistor 42 is deactivated before the lock pin 21 completes the unlocking of the steering shaft 5, power is supplied via the unlock detector 43 and the diode D3 until the unlocking is completed. This guarantees the unlocking of the steering shaft 5. After the locking is completed, the supply of power to the motor 23 is stopped. Thus, even if noise causes the microcomputer 32 to provide the transistors TR1, TR2 with the control signal, the control signal does not drive the motor 23. The unlock detector 43 includes a non-contact type switching device. Thus, the reliability of the unlock detector 43 is higher than a mechanical switch.

(2) The microcomputer 32 stops driving the motor 23 when the state of engagement of the lock pin 21 changes. Thus, the motor 23 is not actuated as long as the lock pin 21 continues to remain in a state in which it locks the steering shaft 5 or unlocks the steering shaft 5. This reduces the load on the motor 23 and prolongs the life of the motor 23.

(3) The microcomputer 32 is directly connected to the battery. Thus, the microcomputer 32 may perform other processes when the automobile is being driven.

The first and second embodiments may be modified as described below.

Figure 8:
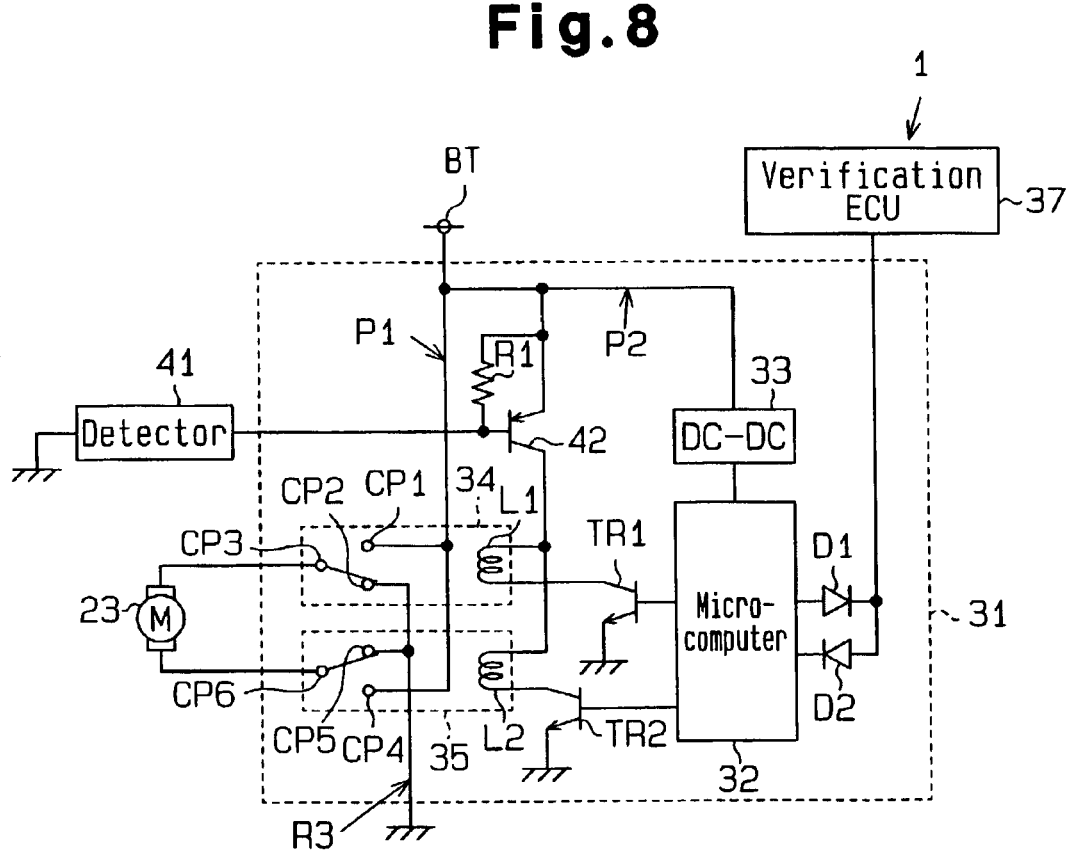
FIG. 8 is a circuit diagram showing a modified example of the control circuit of the electronic steering wheel lock shown in FIG. 5.

Referring to FIG. 8, the power transistor 42 may be connected between the positive terminal BT of the battery and the coils L1, L2 of the relays 34, 35. In this case, a small power transistor, which drives the relays 34, 35, may be used in lieu of the power transistor 42. This would decrease the size and cost of the power transistor 42.

Further, the power transistor 42 may be arranged between the positive terminal BT of the battery and the first fixed contacts CP1, CP4 of the relays 34, 35 (as shown by arrow P1 in FIG. 8). In this case, the power transistor 42 is not connected between the battery and the coils L1, L2 and between the battery and the microcomputer 32. In this example, the motor 23 does not operate in an unintentional manner even if a movable contact contacts one of the first fixed contacts CP1, CP4.

The power transistor 42 may be arranged between the battery and the DC—DC converter 33 (as shown by arrow P2 in FIG. 8). In this case, the power transistor 42 is not connected between the battery and the relays 34, 35.

The power transistor 42 may be arranged between the relays 34, 35 and the ground (as shown by arrow P3 in FIG. 8).

Figure 9A:
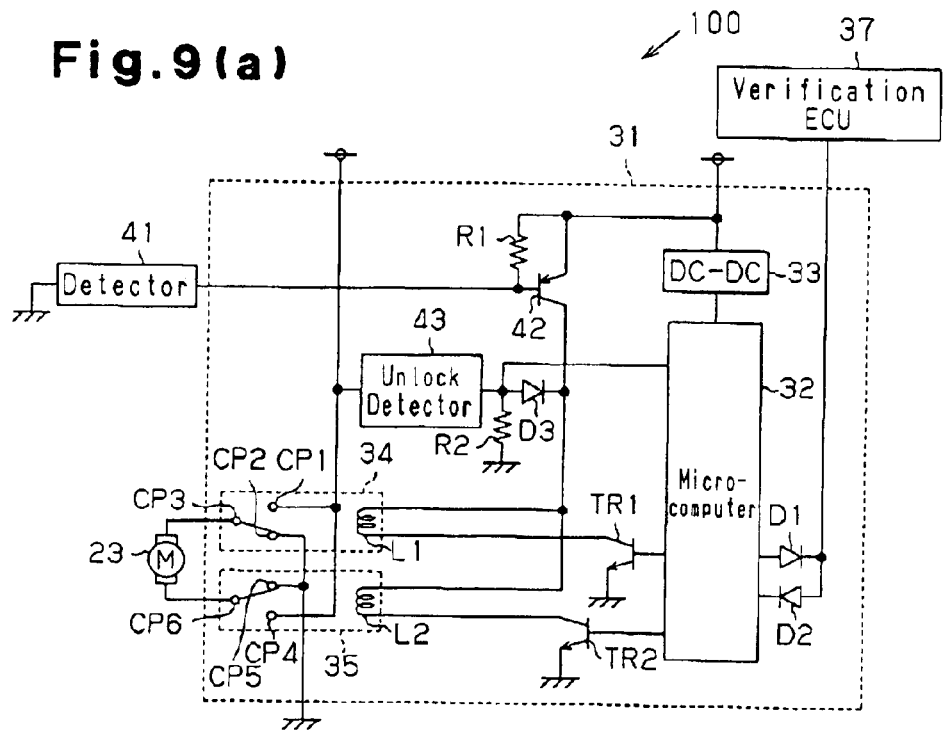
FIGS. 9(a) and 9(b) are circuit diagrams showing modified examples of the control circuit of the electronic steering wheel lock shown in FIG. 5.

As shown in FIG. 9(a), the power transistor 42 and the unlock detector 43 may be connected between the battery and the coils L1, L2 of the relays 34, 35. In this case, a small power transistor may be used in lieu of the power transistor 42. Further, the unlock detector 43 may include a small power non-contact sensor.

Figure 9B:
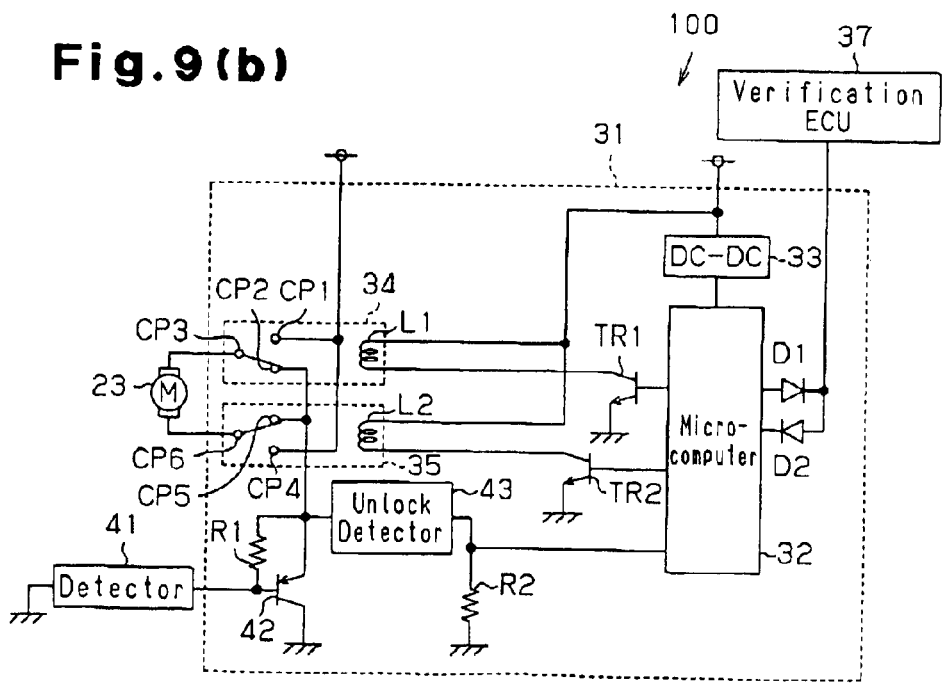

As shown in FIG. 9(b), the power transistor 42 and the unlock detector 43 may be connected between the relays 34, 35 and the ground. More specifically, the emitter terminal of the power transistor 42 and the input terminal of the unlock detector 43 may be connected to the second fixed contacts CP2, CP5. Further, the output terminal of the unlock detector 43 may be connected to the ground via the resistor R2 and to the microcomputer 32. In this case, the diode D3 is unnecessary. Thus, the number of components decreases.

A non-contact switching device, such as a power MOSFET, may be used in lieu of the power transistor 42.

The detector 41 may be arranged in the vicinity of the parking brake to generate a detection signal that activates the power transistor 42 when the parking brake is actuated.

Figure 10:
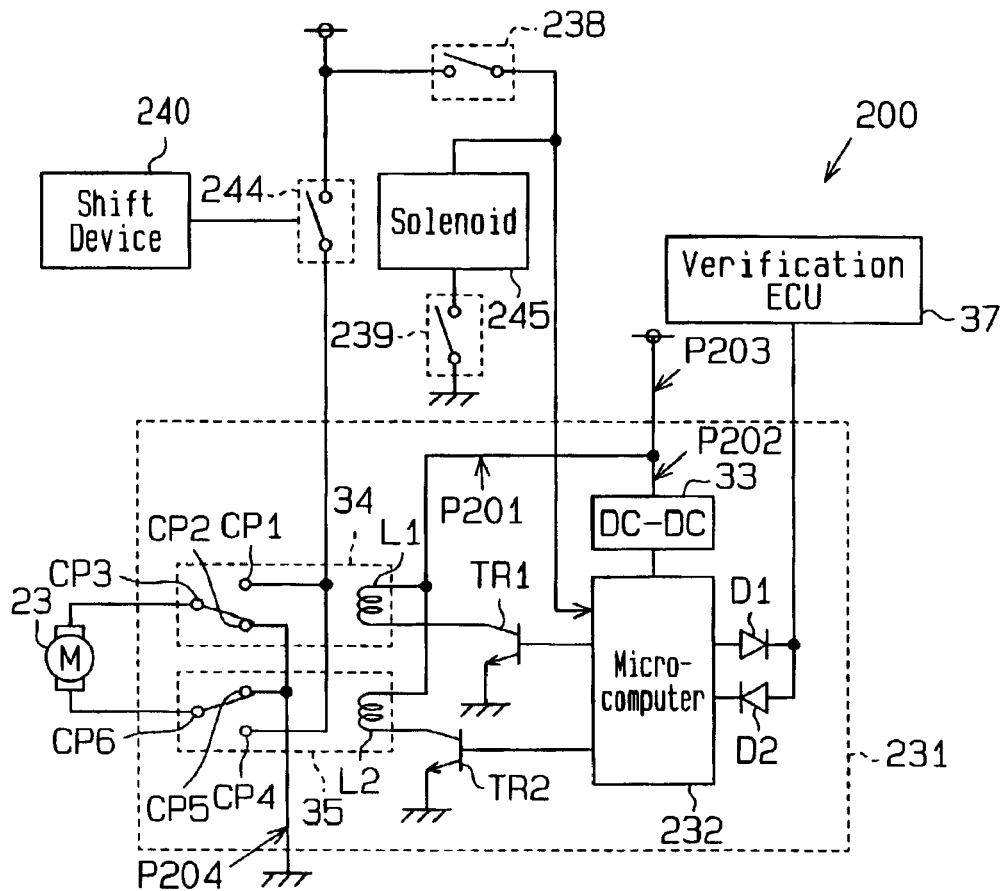
FIG. 10 is a circuit diagram of an electronic steering and shift lever lock according to a third embodiment of the present invention.
Figure 11:
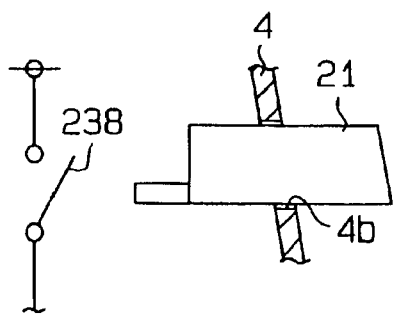
FIGS. 11(a) and 11(b) are schematic diagrams showing the relationship between a lock pin switch and a lock pin in the electronic steering and shift lever lock of FIG. 10.
Figure 11:
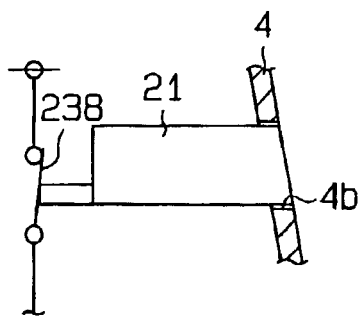

An electronic steering wheel and shift lever lock 200 according to a third embodiment of the present invention will now be discussed with reference to FIGS. 10 to 12. As shown in FIG. 10, the electronic steering wheel and shift lever lock 200 includes an ECU 231, a lock pin switch 238, a brake switch 239, a shift lever switch 244, and a solenoid 245.

Figure 12A:
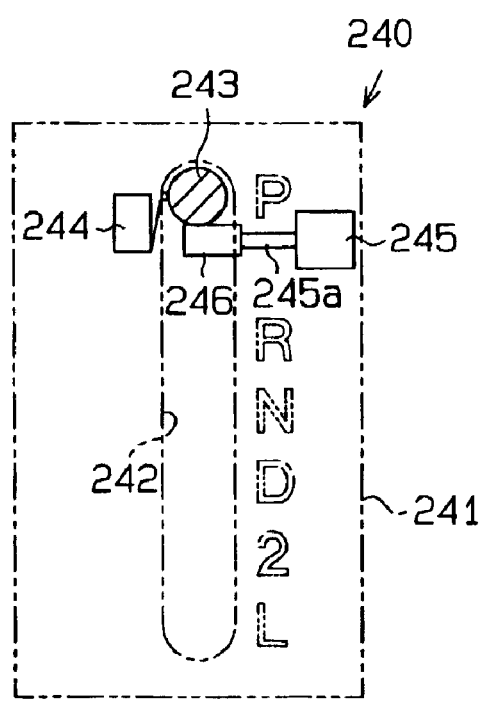
FIGS. 12(a) and 12(b) are schematic diagrams of a shift lever switch and a solenoid in the electronic steering and shift lever lock of FIG. 10.
Figure 12B:
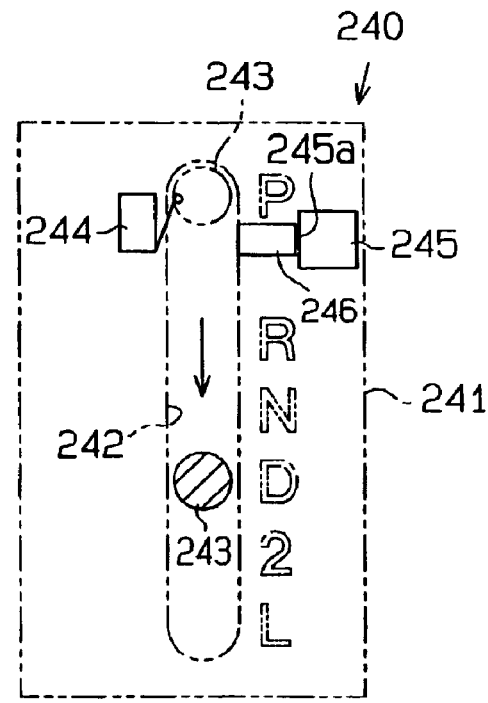

Referring to FIGS. 12(a) and 12(b), the shift lever switch 244 and the solenoid 245 are arranged in a shift device 240, which is arranged in an automobile (not shown). The shift device 240 includes a shift panel 241, which has a linear shift gate 242, and a shift lever 243, which is arranged in the shift gate 242. Characters are marked on the shift panel 241 near the shift gate 242. Character P represents a parking position, character R represents a reverse position, character N represents a neutral position, character D represents a drive position, character 2 represents a second gear position, and character L represents a low gear position. The shift lever 243 is shifted along the shift gate 242 to one of these positions.

The shift lever switch 244 is activated or turned on when the shift lever 243 is located at the "P" position, as shown in the state of FIG. 12(a), and deactivated or turned off when the shift lever 243 is located at a position other than the "P" position, as shown in the state of FIG. 12(b). A contact switch, such as a limit switch or a reed switch, or a non-contact switching device, such as a photoelectric switch or a Hall IC, may be used as the shift lever switch 244. In the third embodiment, a limit switch is employed as the shift lever switch 244.

The solenoid 245 is located near the "P" position. The solenoid 245 includes a rod 245a and a stopper 246, which is arranged on the distal end of the rod 245a. As shown in FIG. 12(a), the stopper 246 of the solenoid 245 moves into the shift gate 242 when the shift lever 243 is arranged at the parking position and the steering wheel is locked. The stopper 246 prohibits the movement of the shift lever 243 from the parking position to other positions. That is, the stopper 246 locks the shift lever 243. As shown in the state of FIG. 12(b), the stopper 246 of the solenoid 245 moves out of the shift gate 242 and enables the movement of the shift lever 243 from the parking position to other positions when the steering wheel lock is released and the brake pedal (not shown) is depressed.

As shown in FIG. 10, the lock pin switch 238, which is connected between a power supply and a positive terminal of the solenoid 245, is actuated in cooperation with the lock pin 21. The lock pin switch 238 is a normal open type mechanical switch arranged near the basal portion of the lock pin 21, as shown in FIGS. 11(a) and 11(b). In the third embodiment, a limit switch is employed as the lock pin switch 238. The lock pin switch 238 goes off when the lock pin 21 is in a locking state, as shown in FIG. 11(a), and goes on when the lock pin 21 is in a lock release state, as shown in FIG. 11(b).

The brake switch 239, which is connected between the negative terminal of the solenoid 245 and the ground, goes on when the driver depresses the brake pedal (not shown) and goes off when the driver does not depress the brake pedal. In the third embodiment, a mechanical switch, such as a limit switch or a reed switch, is used as the brake switch 239.

The solenoid 245 moves the stopper 246 out of the shift gate 242 when the lock pin switch 238 and the brake switch 239 both go on. More specifically, the solenoid 245 is activated only if the lock pin 21 is released from the locking state when the brake pedal is depressed. In other words, the shift lever 243 cannot be moved until the lock is released. Accordingly, the motor 23 is driven until the lock is released.

The microcomputer 232, which is connected to a node between the lock pin switch 238 and the solenoid 245, receives a high voltage signal when the lock pin switch 238 goes on and receives a low voltage signal when the lock pin switch 238 goes off. The microcomputer 232 detects the actuated state of the lock pin switch 238 based on the voltage signal. The microcomputer 232 stops providing the transistors TR1, TR2 with the control signal based on the detection result. That is, the microcomputer 232 stops driving the motor 23 when the state of the lock pin switch 238 changes. The microcomputer 232 also provides the detection result to the verification ECU 37 via the diode D1. The verification ECU 37 acknowledges whether the lock pin 21 and the slot 5a are engaged with or disengaged from each other.

The electronic steering wheel and shift lever lock 200 of the third embodiment has the advantages described below.

(1) The shift lever switch 244 goes on when the shift lever is located at the parking position to permit the actuation of the motor 23. That is, actuation of the motor 23 is prohibited when the automobile is being driven or when driving of the automobile is enabled. This prevents noise from causing the electronic steering wheel and shift lever lock 200 to be operated in an unintentional manner.

The lock pin switch 238 goes off when the lock pin 21 is in a lock release state. This activates the solenoid 245 and moves the stopper 246 out of the shift gate 242. This prohibits the movement of the shift lever 243 from the parking position to other positions until the lock pin 21 is released from the locking state (when the lock pin switch 238 goes off). Thus, the releasing of the lock pin 21 from the locking state is guaranteed. Further, when the engine is not running such as when the automobile is parked, the lock pin switch 238 goes off and the solenoid 245 is not actuated. This saves power when the engine is not running.

(2) The microcomputer 232 stops driving the motor 23 in accordance with changes in the state of the lock pin switch 238. Thus, after the lock pin 21 completes locking or unlocking, the motor 23 is prevented from being continuously driven. This reduces the load applied to the motor 23 and prolongs the life of the motor 23.

(3) The shift lever switch 244, the lock pin switch 238, and the brake switch 239 are mechanical switches that are not affected by noise and have high reliability.

The third embodiment may be modified as described below.

Figure 13:
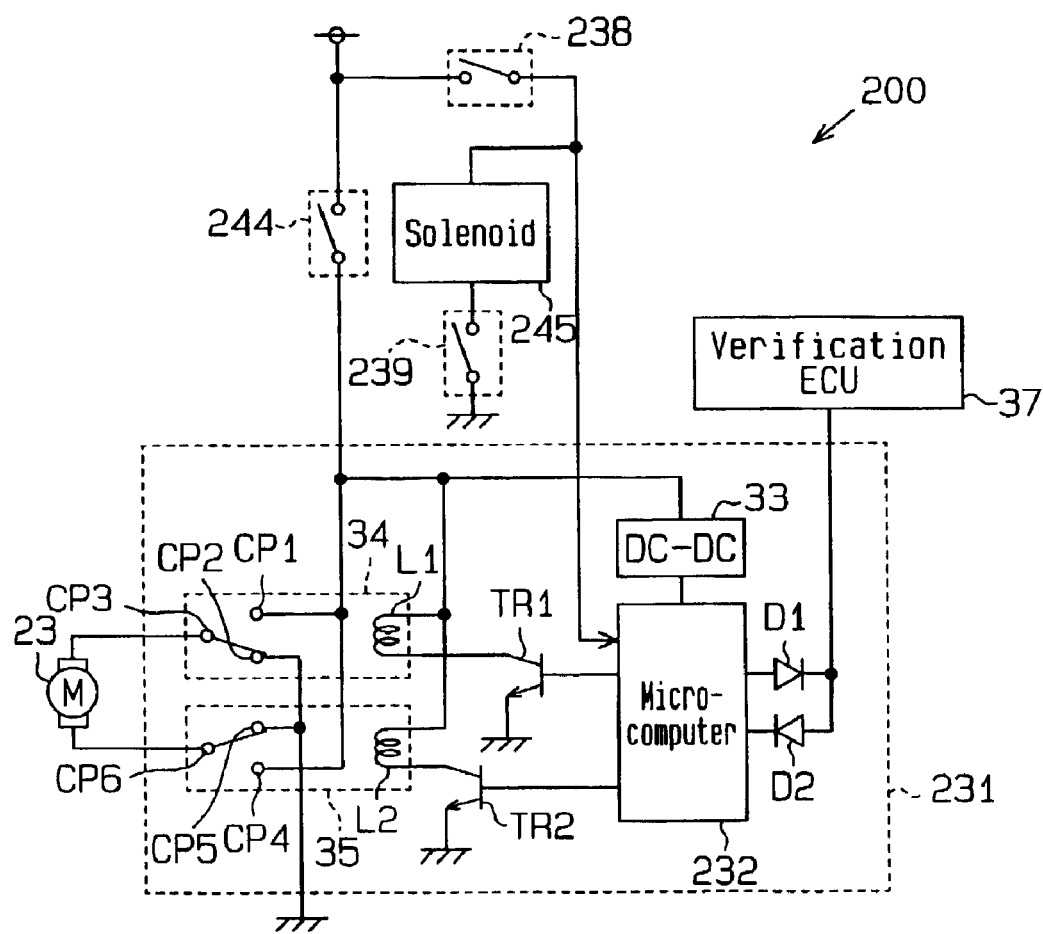
FIG. 13 is a circuit diagram of a first modified example of the electronic steering and shift lever lock of FIG. 10.

As shown in FIG. 13, the shift lever switch 244 may be connected between the DC—DC converter 33, the first fixed contacts CP1, CP4 and the coils L1, L2 of the relays 34, 35, and the power supply. In this case, the entire ECU 231 stops functioning when the shift lever switch 244 goes off. This prevents noise from causing the electronic steering wheel and shift lever lock 200 to be operated in an unintentional manner. Further, the wiring between the shift lever switch 244 and the ECU 231 is simplified.

As shown in FIG. 10, the shift lever switch 244 may be connected between the battery and the coils L1, L2 of the relays 34, 35 (as shown by arrow P201). In this case, the current flowing through the shift lever switch 244 is relatively small. Thus, a small power shift lever switch 244 may be used. This reduces the size and cost of the shift lever switch 244.

The shift lever switch 244 may be connected between the DC—DC converter 33 and a node that is connected to the relays 34, 35 between the battery and the DC—DC converter 33 (as shown by arrow P203 in FIG. 10).

The shift lever switch 244 may be connected between the ground and the second fixed contacts CP2, CP5 of the relays 34, 35 (as shown by arrow P204 in FIG. 10).

Figure 14:
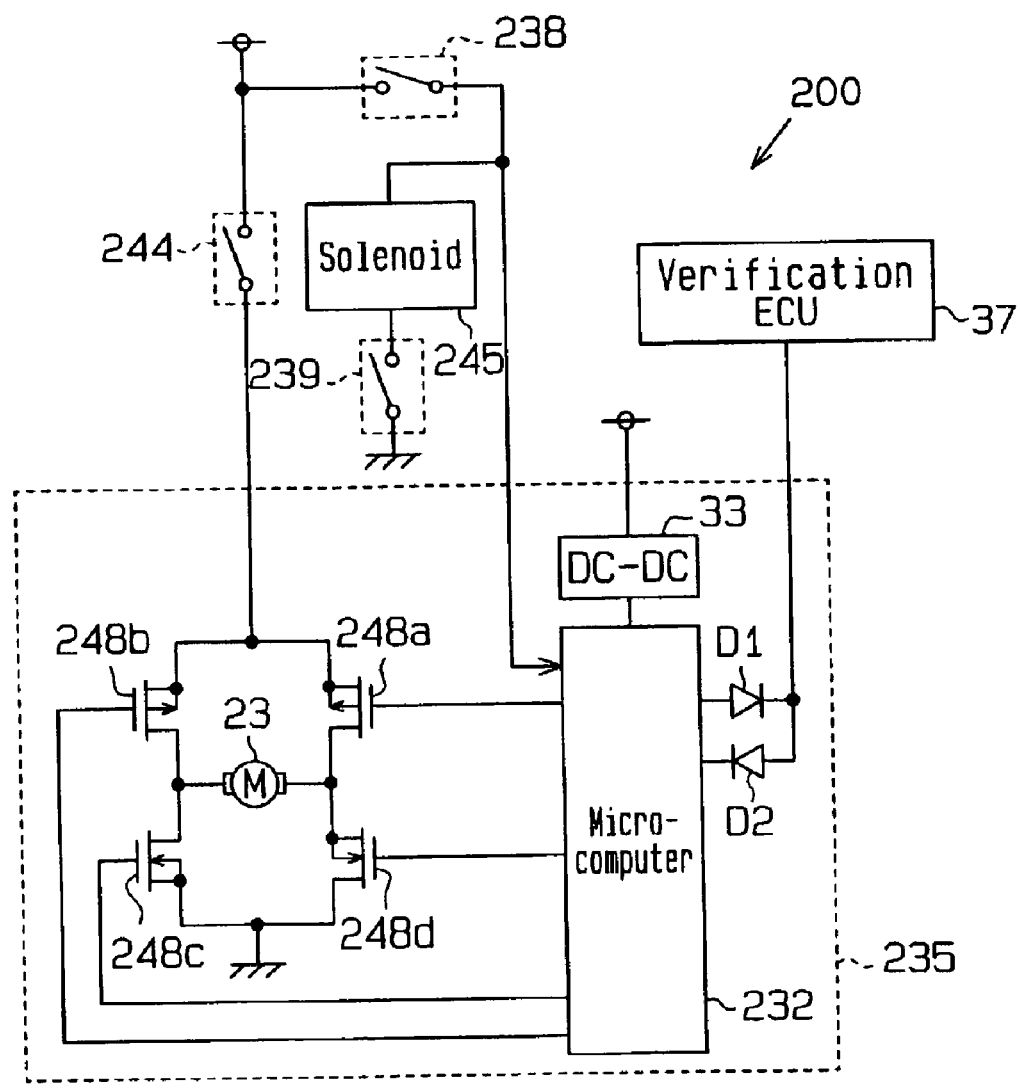
FIG. 14 is a circuit diagram of a second modified example of the electronic steering and shift lever lock of FIG. 10.

As shown in FIG. 14, a bridge circuit configured by two p-channel MOSFETs 248a, 248b and two n-channel MOSFETs 248c, 248d may be used in lieu of the relays 34, 35.

It should be apparent to those skilled in the art that the present invention may be embodied in many other specific forms without departing from the spirit or scope of the invention. Particularly, it should be understood that the present invention may be embodied in the following forms.

An actuator such as a solenoid may be used in lieu of the motor 23.

In addition to the electronic steering wheel lock 1, the present invention may be applied to an electronic driving restriction apparatus that restricts the rotation of wheels, which form part of a drive mechanism.

The present examples and embodiments are to be considered as illustrative and not restrictive, and the invention is not to be limited to the details given herein, but may be modified within the scope and equivalence of the appended claims.

What is claimed is:

1. A electronic automobile anti-theft apparatus comprising:
    a locking means for selectively locking a steering mechanism or a driving mechanism of an automobile;
    an actuator for operating the locking means;
    a control unit for controlling the operation of the actuator, wherein the control unit generates a control signal for controlling the operation of the actuator;
    a detector for detecting the position of a shift lever for a transmission shift device of the automobile and generating a detection signal when the shift lever is located at a parking position;
    a switching device connected to one of the actuator and the control unit to permit power to be supplied to the one of the actuator and the control unit in response to the detection signal;
    a lock position detector connected to one of the actuator and the control unit to detect whether the locking means has been released and to permit power to be supplied from a power supply to one of the actuator and the control unit until the locking means is released; and
    a switching circuit connected to the actuator and the switching device to switch routes for supplying power to the actuator in accordance with the control signal, wherein the switching device and the lock position detector arc connected between the power supply and the switching circuit.

2. The apparatus according to claim 1, wherein the switching device is a non-contact switching device.

3. The apparatus according to claim 1, wherein the lock position detector is connected parallel to the switching device.

4. An electronic automobile anti-theft apparatus comprising:
    a locking means for selectively locking a steering mechanism or a driving mechanism of an automobile;
    an actuator for operating the locking means;
    a control unit for controlling the operation of the actuator;
    a shift lever switch connected to one of the actuator and the control unit and cooperatively operated with a shift lever for a transmission shift device of the automobile, wherein the shift lever switch goes on to permit power to be supplied to the one of the actuator and the control unit when the shift lever is located at a parking position;
    a restriction unit for selectively restricting movement of the shift lever from the parking position to another position, wherein the restriction unit is supplied with power to permit the movement of the shift lever;
    a brake switch connected between the restriction unit and a power supply, wherein the brake switch goes on when a brake of the automobile is operated; and
    a lock switch connected between the restriction unit and the power supply and cooperatively operated with the locking means, wherein the lock switch goes on to permit power to be supplied to the restriction unit when locking by the locking means is released, wherein the shift lever switch, the brake switch, and the lock switch are mechanical switches.

5. The apparatus according to claim 4, wherein the control unit generates a control signal for controlling the operation of the actuator, the apparatus further comprising a switching circuit connected to the actuator and the shift lever switch to switch routes for supplying power to the actuator in accordance with the control signal.

6. The apparatus according to 5, wherein the shift lever switch is connected between the switching circuit and the power supply.

7. The apparatus according to claim 5, wherein the shift lever switch is connected between the switching circuit and the ground.

8. The apparatus according to claim 12, wherein the switching circuit includes a coil excited when the switching circuit is supplied with power, and wherein the shift lever switch is connected between the power supply and the coil.

9. The apparatus according to claim 4, wherein the restriction unit includes:
 a solenoid arranged in the vicinity of the shift device and connected to the power supply via the lock switch; and
 a stopper connected to the solenoid to move between a contact position where the stopper contacts the shift lever arranged at the parking position and a non-contact position where the stopper does not contact the shift lever.

* * * * *

UNITED STATES PATENT AND TRADEMARK OFFICE
CERTIFICATE OF CORRECTION

PATENT NO. : 6,989,611 B2  
DATED : January 24, 2006  
INVENTOR(S) : Masaki Hayashi et al.

It is certified that error appears in the above-identified patent and that said Letters Patent is hereby corrected as shown below:

<u>Column 10,</u>  
Line 37, delete "arc", and insert -- are --.

<u>Column 12,</u>  
Line 1, delete "claim 12", and insert -- claim 5 --.

Signed and Sealed this

Thirteenth Day of June, 2006

JON W. DUDAS  
*Director of the United States Patent and Trademark Office*